United States Patent [19]

Yamaguchi et al.

[11] Patent Number: 4,549,905
[45] Date of Patent: * Oct. 29, 1985

[54] CERAMIC HEATER

[75] Inventors: Shunzo Yamaguchi, Okazaki; Morihiro Atsumi, Toyohashi; Takeshi Fukazawa, Kariya, all of Japan

[73] Assignee: Nippondenso Co., Ltd., Kariya, Japan

[*] Notice: The portion of the term of this patent subsequent to May 15, 2001 has been disclaimed.

[21] Appl. No.: 551,687

[22] Filed: Nov. 14, 1983

[30] Foreign Application Priority Data

Nov. 17, 1982 [JP] Japan .................. 57-201761

[51] Int. Cl.[4] .......... B22F 5/00; C04B 35/44; H05B 3/10
[52] U.S. Cl. .................. 75/238; 219/553; 252/507; 252/508; 252/513; 252/516; 252/520
[58] Field of Search .......... 75/236, 238; 219/270, 219/541, 553; 252/507, 513, 516, 520; 338/30; 361/266

[56] References Cited

U.S. PATENT DOCUMENTS

| 3,895,219 | 7/1975 | Richerson et al. | 219/553 |
| 3,996,168 | 12/1976 | Hoffmann et al. | 252/520 |
| 4,029,828 | 6/1977 | Bildstein et al. | 252/520 X |
| 4,060,663 | 11/1977 | Merz et al. | 428/428 |
| 4,094,061 | 6/1978 | Cupta | 29/612 |
| 4,098,725 | 7/1978 | Yamamoto et al. | 252/519 |
| 4,107,510 | 8/1978 | Tombs et al. | 219/541 |
| 4,341,965 | 7/1982 | Okuto et al. | 252/520 |
| 4,366,254 | 12/1982 | Rich et al. | 501/89 |
| 4,449,039 | 5/1984 | Fukazawa et al. | 219/270 |

Primary Examiner—Edward A. Miller
Assistant Examiner—Anne Brookes
Attorney, Agent, or Firm—Cushman, Darby & Cushman

[57] ABSTRACT

A ceramic heater having a heating element of a sintered mixture comprising alumina, titanium nitride and titanium carbide, is discribed. The heating element has a good oxidation resistance, and a relatively high temperature coefficient of resistance. The larger composition of titanium nitride acts to increase the temperature coefficient of resistance. The larger composition of alumina acts to prevent oxidation increase and to improve the sintering. The adequate composition of each ingredients can result in a suitable heating element for a ceramic heater.

6 Claims, 5 Drawing Figures

CERAMIC HEATER

BACKGROUND OF THE INVENTION

1. Field of the Invention

The present invention relates to a ceramic heater and more particularly to a ceramic heater having improved durability.

2. Description of the Prior Art

Conventionally, such electric heating alloys as Ni—Cr—(Fe) and Fe—Cr—Al have been widely used as a heating element for heating or ignition use. Non-metallic elements composed of such materials as silicon carbide, zirconia, molybdenum silicide, lanthanum chromite, and carbon are also commercially available.

As nickel-chromium alloy is easily oxidized, the heating element composed of the alloy is used under limited conditions. Also the element may decrease gradually in cross sectional area by oxidation. This, in turn, will give rise to severe local heating, which may result in self burn-out of the element.

Non-metallic materials described above are not so widely used as is nickel-chromium alloy, because of their low oxidation resistance or high fabrication cost.

SUMMARY OF THE INVENTION

It is therefore, a primary object of the present invention to provide a ceramic heater with a heating element having a good oxidation resistance.

It is another object of the present invention to provide a long-life ceramic heater of an excelent mechanical strength.

It is further object of the present invention to provide a ceramic heater with a heating element which has a suitable specific resistance.

Accordingly, the invention provides a ceramic heater having a heating element of a sintered mixture comprising alumina and titanium nitride and titanium carbide. The ceramic heater may have a supporting substrate of insulating materials with which the heating element is covered.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
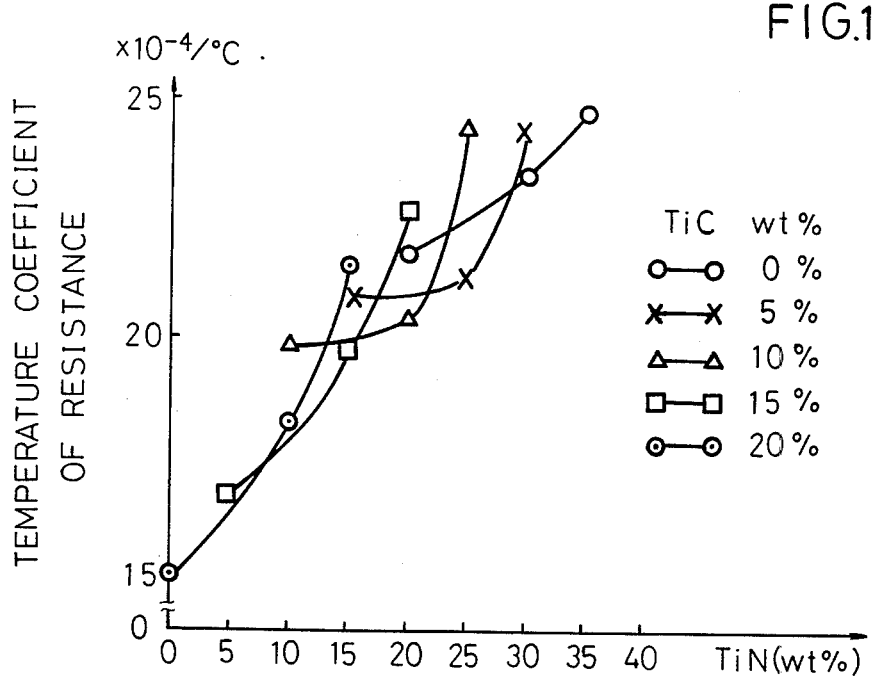
FIG. 1 is a graph showing the relationship between the composition of titanium nitride and the temperature coefficient of resistance of the ceramic heater, varying the composition of titanium carbide as a parameter.

The ceramic heater of the present invention has a sintered element of a powdery mixture comprising alumina, titanium nitride and titanium carbide.

In this invention, the ceramic heaters are defined to include a sintered heating element bonded to or covered with a supporting substrate as well as a heating element consisting of only a sintered body.

The ceramic heaters of the present invention are characterized by a sintered body obtained by sintering a powdery mixture of alumina, titanium nitride and titanium carbide.

As is well known, titanium nitride and titanium carbide have superior mechanical strength at high temperatures, and excellent thermal stability, as easily understood by their use as main ingredient of cermets used for anti-fraction parts and cutting tools such as throw-away tips. They have a low coefficient of thermal expansion as $9.3 \times 10^{-6}$ °C.$^{-1}$ and $7.6 \times 10^{-6}$ °C.$^{-1}$, respectively. However, titanium nitride has low specific electrical resistances: $1 \times 10^{-5}$ Ωcm at room temperature, $6 \times 10^{-4}$ Ωcm at 1000° C., and titanium carbide: $7 \times 10^{-5}$ Ωcm, $1 \times 10^{-4}$ Ωcm at 1000° C. Such resistances are too small for a heating element, and the thermal stabilities are not sufficient. The inventors have found that the resistivity of sintered bodies can be controlled and fine ceramics can be obtained by mixing alumina with titanium nitride and titanium carbide for the raw materials, and completed the present invention.

This sintered body makes an effective increase of the specific resistance to a level suitable as a heating element. For example, the specific resistance of a sintered body made of titanium nitride and titanium carbide at mixing ratio of 8:2 in 100% by weight (hereafter, % means % by weight) is $4 \times 10^{-5}$ at room temperature. While the addition of alumina in 20%, 50%, 70%, 80%, and 90% to the aforesaid compound results sintered bodies with the higher specific resistance of $9.3 \times 10^{-5}$, $3.8 \times 10^{-4}$, $3.3 \times 10^{-3}$, $4.8 \times 10^{-2}$ and $5.6 \times 10^2$ Ωcm, respectively. The ranges of compositions usable for heating elements are preferably 15-50% for titanium nitride and titanium carbide, and 85-50% for alumina. The specific resistance of a sintered body is varried depending on the composition of added alumina, thus, the resistivity is lowered as the composition of alumina decreases. When the alumina is contained below 50%, the specific resistance in this order is below $10^{-4}$ Ωcm, and when the alumina is contained above 85%, the specific resistance is above $10^{-1}$ Ωcm. The aforesaid range of alumina is most preferable so as to provide the optimum specific resistance of $10^{-3}$ Ωcm for the heater. For the effective sintering, alumina is preferred to be contained more than 50%. When alumina is less than 50%, the degree of sintering is not enough so that the relative density of the sintered body is lowered, resulting in an inferior oxidation resistance.

However, the sintered body containing alumina out of the aforesaid range, can be used for the heater in some kinds of shape. Therefore, the range of alumina in the present invention is not specified only in the above mentioned range.

Titanium nitride acts to increase the temperature coefficient of resistance of the sintered body, thus the temperature coefficient of resistance increases as the composition of titanium nitride is raised. In the case that the resistance of the heating element is detected to calculate the temperature for heating thereby to control the power supply, the higher temperature coefficient of resistance of the sintered body is preferred in order to improve the detecting sensitivity.

Accordingly, when the heating element is used as a temperature sensor, the composition of titanium nitride is preferred to be larger.

However, when the composition ratio of titanium nitride is relatively larger in a compound of titanium carbide and titanium nitride, the sintering becomes harder. While, the adequate amount of titanium nitride can help the sintering because titanium carbide can solid-solved with titanium nitride. 5% of titanium carbide is most preferable for the improved sintering, oxidation resistance and mechanical strength. Also the specific resistance is decreased.

Considering adequate specific resistance for a ceramic heater, temperature coefficient of resistance for controlling electricity of a ceramic heater, oxidation resistance, and mechanical strength, it is preferred that the composition of the sintered body is 50-85% for alumina and 50-15% for titanium nitride and titanium carbide.

The preferred ratio of titanium nitride and titanium carbide is 50-95%:5-50% (total amount of titanium nitride and titanium carbide is 100%), and in this case, the heating element having the temperature coefficient of resistance above $20 \times 10^{-4}/°C$. can be obtained.

In sintered bodies for heating elements of the present invention, addition of 0.05-5% magnesium oxide to titanium nitride and titanium carbide and alumina is effective to produce ceramic heaters with a constant quality.

Magnesium oxide acts to suppress the abnormal crystal growth of alumina, and effectively decreases distortion of titanium nitride and titanium carbide involved in the grain boundary movement, which is caused by the excessive growth of alumina crystals. Thus, magnesium oxide can prevent the element from local heating. However, magnesium oxide in excess of 5% may decrease the strength of the sintered bodies.

Addition of about 0.05-7.5% of nickel to titanium nitride and titanium carbide and alumina can provide more dense sintered bodies, decrease the dependancy of the specific resistance on the sintering temperatures, improve their life as a ceramic heater, and enable a mass-production.

In the atmospheric sintering, alumina is sufficiently densified at 1650°-1850° C., for the fusing point of alumina is approximately 2050° C. However, each fusing point of titanium nitride and titanium carbide is approximately 3000° C. and 3140° C., respectively, so that the composite material consisting of titanium nitride, titanium carbide and alumina is not sufficiently densified at the aforementioned temperature range. The added nickel helps to densify such titanium nitride and titanium carbide.

The sintered bodies of the present invention are made as follows.

The raw materials in a desired composition are crushed and mixed together in a ball mill or a vibrating mill. Then the resulting mixed powder are formed to be granulated powders, or blended with a binder to form a slurry or a liquid is added to make paste according to a desired purpose of use.

In order to produce a bar-shaped ceramic heater, granulated powders may be pressed into a mold to make a compressed body. In order to produce a thin plate ceramic heater, the powdery mixture may be added with a liquid to make paste and a doctor blade is used to form a thin plate made of the paste, which is punched to form a thin green compact with a desired shape.

In order to produce a printed heater, the paste may be screen-printed on a substrate. The green compacts described above, are then sintered at 1650° C.-1850° C., more preferably at 1750° C.-1800° C., after a drying process, if required. The sintering may be carried out in non-oxidative or inert atmosphere, or in vacuum below $10^{-2}$ Torr to prevent titanium nitride and titanium carbide from being oxidized. The ceramic heaters or heating elements of the present invention can be produced by the method described above.

DESCRIPTION OF THE PREFERRED EMBODIMENT

Table shows sintered test specimens having twenty kinds of compositions No. 1–No. 20.

The test specimens were produced as follows. The raw materials in a desired composition were crushed and mixed together, then the granulated powders were pressed into a mold to make a bar-shaped compressed body. After dried for a certain period, it was sintered at 1750 C. for two hours. The sintering was carried out in nitrogen atomosphere to prevent oxidization. Thus, the bar-shaped ceramic heaters were formed. At both ends of each ceramic heater, terminals made of aluminum were metalized to measure the specific resistance and the first temperature coefficient of resistance. The relative density and the oxidation weight increase ($g/cm^2$) after 150 hours of exposure in 1200° C. atmosphere, were also measured. The temperature coefficient of resistance is the first temperature coefficient of resistance at 700° C. to the standard temperature 20° C.

Figure 2:
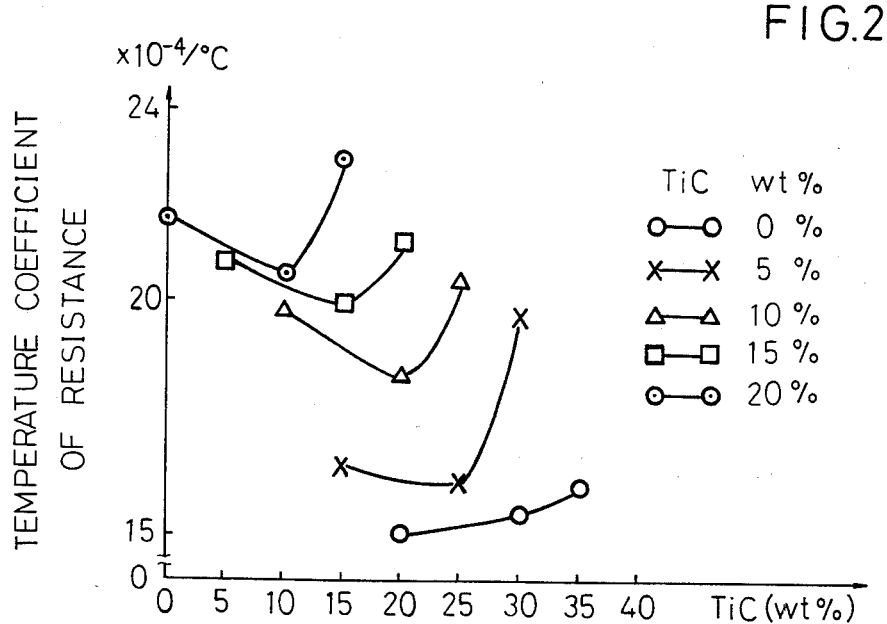
FIG. 2 is a graph showing the relationship between the composition of titanium carbide and the temperature coefficient of resistance, varying the composition of titanium nitride as a parameter.

FIG. 1 is a graph showing the relationship between the temperature coefficient of resistance and the composition of titanium nitride, by varying the composition of titanium carbide as a parameter. FIG. 2 is a graph showing te relationship between the temperature resistance coefficient and the composition of titanium carbide, by varying the composition of titanium nitride as a parameter. As apparent from FIG. 1 and FIG. 2, the temperature coefficient of resistance increased with the increase of the composition of titanium nitride, while it scarcely changed with the increase of the composition of titanium carbide.

Figure 3:
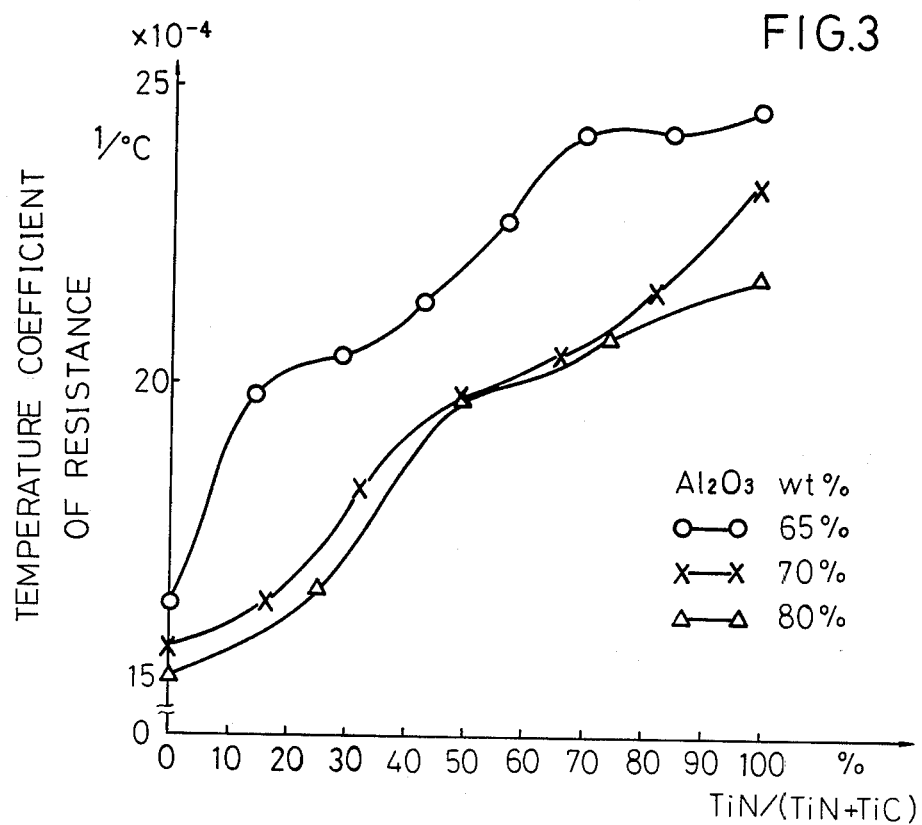
FIG. 3 is a graph showing the relationship between the composition of titanium nitride to the total amount of titanium nitride and titanium carbide, and the temperature coefficient of resistance of the ceramic heater, varying the composition of alumina as a parameter.

FIG. 3 is a graph showing the relationship between the temperature coefficient of resistance and the composition of titanium nitride to the total composition of titanium nitride and titanium carbide, by varying the composition of alumina as a parameter. As apparent from FIG. 3, the resistance temperature coefficient increased with the increase of the composition of titanium nitride and titanium carbide, concerning every composition ratio of alumina. Especially, the lower composition of alumina, i.e. the higher composition of titanium nitride and titanium carbide, can cause the higher

TABLE

| | NO | Al₂O₃ | TiC | TiN | Ni | RELATIVE DENSITY (%) | OXIDATION WEIGHT INCREASE g/cm² × 10⁻² | TEMPERATURE COEFFICIENT OF RESISTANCE 1/°C. × 10⁻⁵ |
|---|---|---|---|---|---|---|---|---|
| REF. | 1 | 70 | 30 | 0 | 2.5 | 92.1 | 5.3 | 155 |
| EMBOD. | 2 | ↑ | 25 | 5 | ↑ | 92.2 | 5.0 | 163 |
| ↑ | 3 | ↑ | 20 | 10 | ↑ | 93.0 | 4.8 | 182 |
| ↑ | 4 | ↑ | 15 | 15 | ↑ | 93.2 | 4.5 | 198 |
| ↑ | 5 | ↑ | 10 | 20 | ↑ | 93.6 | 3.2 | 205 |
| ↑ | 6 | ↑ | 5 | 25 | ↑ | 94.2 | 2.8 | 216 |
| REF. | 7 | ↑ | 0 | 30 | ↑ | 91.5 | 5.5 | 234 |
| ↑ | 8 | 80 | 20 | 0 | 1.7 | 93.5 | 1.0 | 150 |
| EMBOD. | 9 | ↑ | 15 | 5 | ↑ | 93.6 | 0.94 | 165 |
| ↑ | 10 | ↑ | 10 | 10 | ↑ | 94.3 | 0.96 | 198 |
| ↑ | 11 | ↑ | 5 | 15 | ↑ | 95.1 | 0.90 | 209 |
| REF. | 12 | ↑ | 0 | 20 | ↑ | 92.5 | 0.99 | 218 |
| ↑ | 13 | 65 | 35 | 0 | 2.9 | 90.2 | 8.9 | 162 |
| EMBOD. | 14 | ↑ | 30 | 5 | ↑ | 90.5 | 8.8 | 198 |
| ↑ | 15 | ↑ | 25 | 10 | ↑ | 91.6 | 6.9 | 204 |
| ↑ | 16 | ↑ | 20 | 15 | ↑ | 92.7 | 7.1 | 214 |
| ↑ | 17 | ↑ | 15 | 20 | ↑ | 92.9 | 7.0 | 228 |
| ↑ | 18 | ↑ | 10 | 25 | ↑ | 93.2 | 6.5 | 243 |
| ↑ | 19 | ↑ | 5 | 30 | ↑ | 93.3 | 5.9 | 243 |
| REF. | 20 | ↑ | 0 | 35 | ↑ | 90.4 | 8.5 | 247 | temperature coefficient of resistance as a whole. Consequently, the resistance temperature coefficient of the ceramic heater can be raised by increasing the composition of titanium nitride to the total amount of titanium carbide and titanium nitride.

Figure 4:
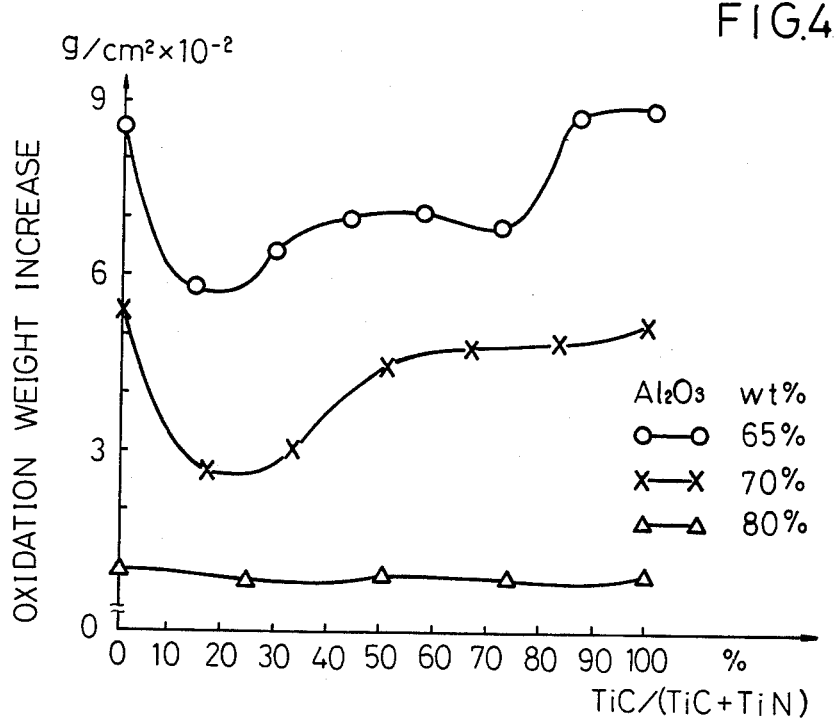
FIG. 4 is a graph showing the composition of titanium carbide to the total amount of titanium nitride and titanium carbide and the oxidation weight increase, varying the composition of alumina as a parameter.

FIG. 4 is a graph showing the relationship between the composition of titanium carbide to the total amount of titanium carbide and titanium nitride, and the oxidation increase of the ceramic heater. In this figure, the composition ratio of alumina is varied as a parameter. The figure shows that at 20% of titanium carbide to the total amount of titanium nitride and titanium carbide, the oxidation increase was at the least value. It also shows that the higher composition of alumina resulted in the lower oxidation increase.

Figure 5:
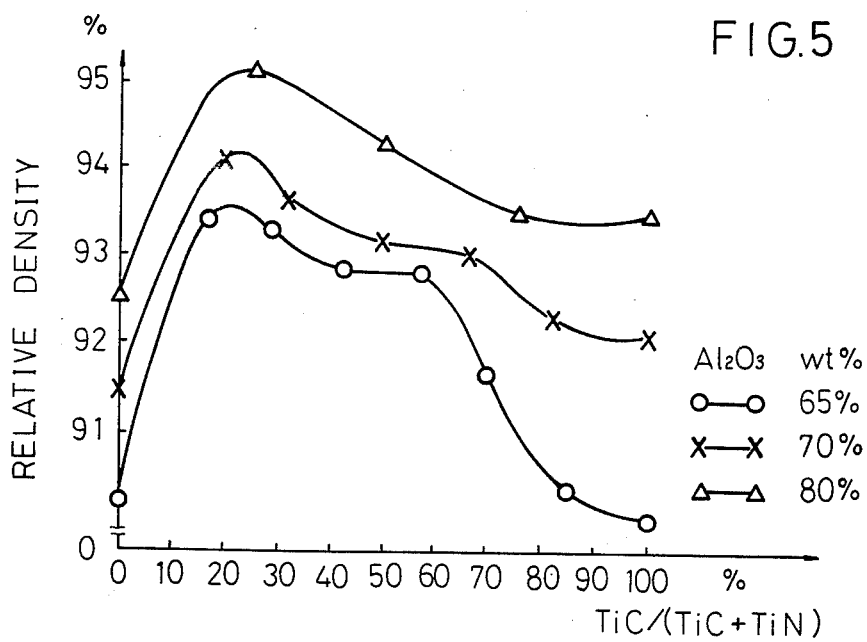
FIG. 5 is a graph showing the relationship between the composition of titanium nitride to the total amount of titanium nitride and titanium carbide and the relative density of the ceramic heater, varying the composition of alumina as a parameter.

FIG. 5 is a graph showing the relationship between the composition of titanium carbide to the total amount of titanium carbide and titanium nitride, and the relative density of the ceramic heater. In this figure, the composition of alumina is a parameter. As apparent from this graph, at 20% of titanium carbide to the total amount of titanium carbide and titanium nitride, the relative density was at the highest value. At the same composition of titanium carbide, the relative density was higher with the higher composition of alumina. Consequently, this shows that the higher composition of alumina acts to improve the sintering.

What is claimed is:

1. A ceramic heater having a heating element consisting essentially of a sintered body of a powdery mixture consisting essentially of
   50-15% by weight of titanium nitride and titanium carbide and
   balance of alumina.
2. A ceramic heater according to claim 1,
   wherein said sintered body has temperature coefficient of resistance above $20 \times 10^{-4}$/°C.
3. A ceramic heater according to claim 1, wherein the ratio of titanium nitride and titanium carbide is 50-95% by weight:5-50% by weight.
4. A ceramic heater according to claim 1, wherein said powdery mixtue contains 0.05-5% by weight of magnesium oxide.
5. A ceramic heater according to claim 1, wherein said powdery mixture contains 0.05-7.5% by weight of nickel.
6. A ceramic heater according to claim 1, wherein said sintered body has a specific resistance in the range of from $10^{-1}$ to $10^{-4}$ Ωcm.

* * * * *